(12) United States Patent
Nagai (10) Patent No.: US 11,534,852 B2
(45) Date of Patent: Dec. 27, 2022

(54) MANUFACTURING METHOD OF JOINED BODY AND JOINED BODY (71) Applicant: KYB-YS CO., LTD., Nagano (JP)

(72) Inventor: Yasuyuki Nagai, Nagano (JP)

(73) Assignee: KYB-YS CO., LTD., Nagano (JP)

( * ) Notice: Subject to any disclaimer, the term of this patent is extended or adjusted under 35 U.S.C. 154(b) by 255 days.

(21) Appl. No.: 16/493,154

(22) PCT Filed: Mar. 14, 2018

(86) PCT No.: PCT/JP2018/010037
§ 371 (c)(1),
(2) Date: Sep. 11, 2019

(87) PCT Pub. No.: WO2018/180500
PCT Pub. Date: Oct. 4, 2018

(65) Prior Publication Data
US 2020/0114464 A1 Apr. 16, 2020

(30) Foreign Application Priority Data
Mar. 29, 2017 (JP) .............................. JP2017-064976

(51) Int. Cl.
*B23K 20/12* (2006.01)
*F15B 15/14* (2006.01)
*B23K 101/06* (2006.01)

(52) U.S. Cl.
CPC .......... *B23K 20/12* (2013.01); *F15B 15/1438* (2013.01); *B23K 2101/06* (2018.08)

(58) Field of Classification Search
None
See application file for complete search history.

(56) References Cited

U.S. PATENT DOCUMENTS 3,793,704 A * 2/1974 Antonevich ............. B23K 1/06
228/40
4,832,769 A * 5/1989 Shantz .................. B29C 66/135
228/114.5

(Continued)

FOREIGN PATENT DOCUMENTS

GB 1011128 A 11/1965
JP 2007-229719 A 9/2007

(Continued)

OTHER PUBLICATIONS

An Baoxiang, "Technology of nondestructive testing in automobile manufacturing", Beijing Institute of Technology Press.

*Primary Examiner* — Devang R Patel
(74) *Attorney, Agent, or Firm* — Rabin & Berdo, P.C.

(57) ABSTRACT

A manufacturing method for manufacturing a cylinder tube includes a joining step of joining a tube main body and a head member by friction welding by abutting an end surface of the tube main body and a flange portion of the head member in a state in which a through hole of the tube main body and a projecting portion of the head member are fitted to each other so as to form a predetermined clearance. In the joining step, a non-contact portion of the flange portion of the head member facing the clearance is joined to the tube main body by heating the non-contact portion with friction heat generated by relative rotation between the tube main body and the head member.

7 Claims, 11 Drawing Sheets

(56) References Cited

U.S. PATENT DOCUMENTS

| | | | | |
|---|---|---|---|---|
| 4,944,977 | A * | 7/1990 | Shantz | B29C 65/0672 |
| | | | | 428/35.8 |
| 5,211,100 | A | 5/1993 | Fuller et al. | |
| 8,286,852 | B2 * | 10/2012 | Kolbe | B23K 20/129 |
| | | | | 228/114 |
| 10,618,130 | B2 * | 4/2020 | Matsuyama | B23K 20/12 |
| 2010/0119772 | A1 * | 5/2010 | Christ | B23K 20/1295 |
| | | | | 428/138 |
| 2010/0233501 | A1 | 9/2010 | Messer et al. | |
| 2016/0265473 | A1 * | 9/2016 | Jiang | F01L 3/08 |
| 2018/0291934 | A1 * | 10/2018 | Kobayashi | B23K 20/12 |

FOREIGN PATENT DOCUMENTS

| | | | |
|---|---|---|---|
| JP | 2007229719 A * | 9/2007 | |
| JP | 2008-012573 A | 1/2008 | |
| JP | 2012-057696 A | 3/2012 | |
| KR | 1020090031435 A | 3/2009 | |
| RU | 2366552 C2 | 9/2009 | |
| WO | 2004033143 A1 | 4/2004 | |

\* cited by examiner

MANUFACTURING METHOD OF JOINED BODY AND JOINED BODY

TECHNICAL FIELD

The present invention relates to a manufacturing method of a joined body and to the joined body.

BACKGROUND ART

JP2012-57696A discloses a manufacturing method of a joined body including: a step of forming an annular joining face by providing a recessed portion in an end surface of a short shaft portion; a step of forming an annular joining face by providing a recessed portion in one end surface of a shaft member; and a step of performing a friction welding by abutting both annular joining faces.

SUMMARY OF INVENTION

As disclosed in JP2012-57696A, with the method of manufacturing the joined body by joining joining members respectively having hollow portions by means of the friction welding, there is a risk in that the hollow portion inside the joining face is recognized as a defect in a quality inspection of the joining face by a nondestructive test. Therefore, there is a risk in that it becomes difficult to perform the quality inspection of the joined body by the nondestructive test.

Objects of the present invention are to provide a manufacturing method of a joined body capable of performing a quality inspection with ease, and to provide the joined body.

According to one aspect of the present invention, a manufacturing method for manufacturing a joined body by joining a first member and a second member, the first member having a hollow portion formed in an end surface and the second member having a projecting portion that is to be fitted into the hollow portion and a flange portion that is provided so as to extend radially outwards from the projecting portion, the manufacturing method includes a joining step of joining the first member and the second member by friction welding by abutting an end surface of the first member and the flange portion of the second member in a state in which the hollow portion of the first member and the projecting portion of the second member are fitted to each other so as to form a predetermined clearance. In the joining step, a non-contact portion of the flange portion of the second member facing the clearance is joined to the first member by heating the non-contact portion with friction heat generated by relative rotation between the first member and the second member, and the joined body is a cylinder tube or a piston rod used for a fluid pressure cylinder.

According to other aspect of the present invention, a joined body includes a first member having a hollow portion formed in an end surface, and a second member having a projecting portion that is to be fitted into the hollow portion and a flange portion that is provided so as to extend radially outwards from the projecting portion and that is to be joined to an end surface of the first member. A joint interface between the end surface of the first member and the flange portion of the second member extends radially outwards from a base portion of the projecting portion.

DESCRIPTION OF EMBODIMENTS

Embodiments of the present invention will be described below with reference to the drawings.

In the following description, a description is given for a case in which joined bodies are a cylinder tube 100 and a piston rod 101 of a hydraulic cylinder (a fluid pressure cylinder) 1.

An overall configuration of the hydraulic cylinder 1 provided with the cylinder tube 100 and the piston rod 101 as the joined bodies will be described first with reference to FIG. 1.

The hydraulic cylinder 1 is an actuator that is extended/contracted by pressures of working oil (working fluid) in two cylinder chambers (i.e. a rod side chamber 3 and a counter rod side chamber 4).

Figure 1:
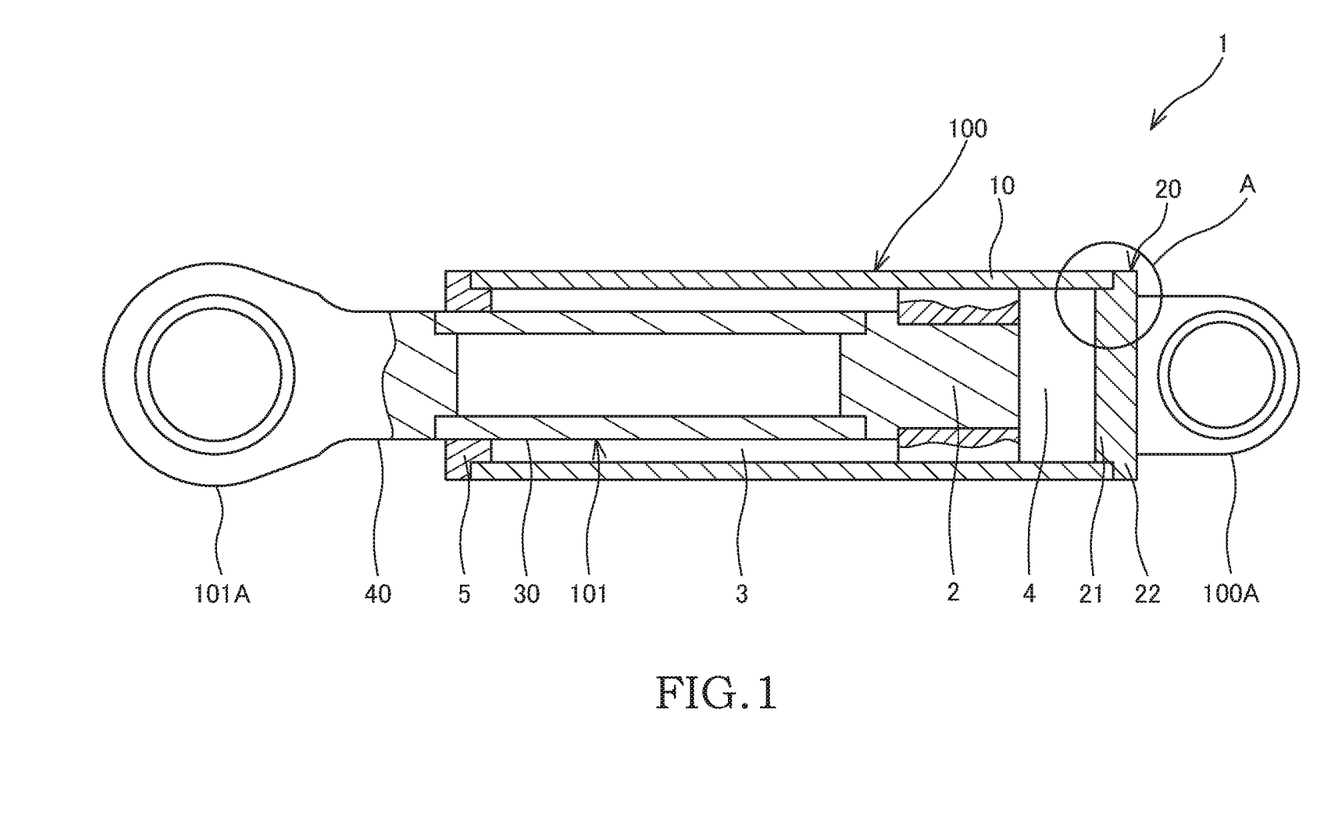
FIG. 1 is a partial sectional view showing a configuration of a hydraulic cylinder.

As shown in FIG. 1, the hydraulic cylinder 1 is provided with the cylindrical cylinder tube 100, the piston rod 101 that is inserted into the cylinder tube 100, and a piston 2 that is provided on an end portion of the piston rod 101 and that slides along an inner circumferential surface of the cylinder tube 100.

The cylinder tube 100 is provided with a cylindrical cylinder head 5 that seals an opening of the cylinder tube 100 on one end (front end) and supports the piston rod 101 in a freely slidable manner. The cylinder head 5 is fastened to the cylinder tube 100 by a plurality of fastening bolts (not shown) arranged along the circumferential direction.

As shown in FIG. 1, attachment parts (clevis) 100A and 101A for attaching the hydraulic cylinder 1 to other devices are respectively provided on a rear end portion of the cylinder tube 100 and a front end portion of the piston rod 101. The piston 2 is screw-fastened to a rear end portion of the piston rod 101.

An interior of the cylinder tube 100 is partitioned by the piston 2 into the rod side chamber 3 and the counter rod side chamber 4. The rod side chamber 3 and the counter rod side chamber 4 are filled with working oil serving as working fluid.

In the hydraulic cylinder 1, the working oil is supplied to the counter rod side chamber 4 and discharged from the rod side chamber 3 through ports (not shown) provided on the cylinder tube 100, and thereby, the piston rod 101 is moved in the extending direction. In addition, in the hydraulic cylinder 1, the working oil is supplied to the rod side chamber 3 and discharged from the counter rod side chamber 4, and thereby, the piston rod 101 is moved in the contracting direction. As the working oil is supplied to and discharged from the cylinder chambers (the rod side chamber 3 and the counter rod side chamber 4) within the cylinder tube 100 during the extension and contraction, the pressure of the working oil acts on the cylinder tube 100 as an internal pressure.

Next, a manufacturing method of the cylinder tube 100 and the piston rod 101 as the joined bodies will be described with main reference to FIGS. 2 to 7.

A manufacturing method of the cylinder tube 100 will be described first.

As shown in FIG. 1, the cylinder tube 100 is manufactured by joining a tube main body 10 serving as a first member and a head member 20 serving as a second member by means of a friction welding (joining step).

Figure 2:
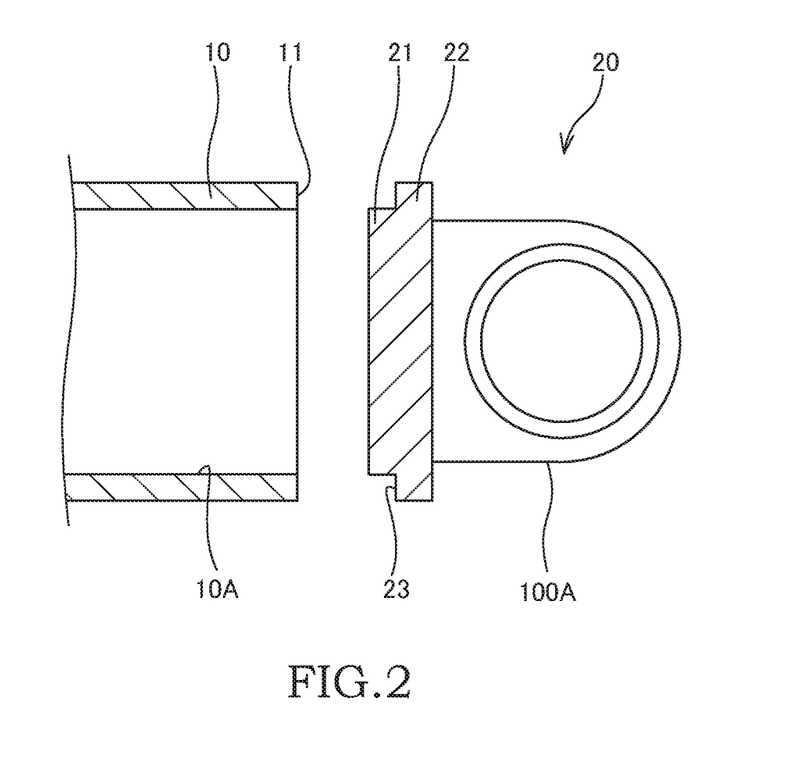
FIG. 2 is a sectional view for explaining a manufacturing method of a cylinder tube according to an embodiment of the present invention, and is a diagram showing a state before a joining.

As shown in FIGS. 1 and 2, the tube main body 10 is formed to have a cylindrical shape having a through hole 10A that opens at both end surfaces in the axial direction. The both end surfaces of the tube main body 10 are formed as annular flat surfaces. The through hole 10A corresponds to a hollow portion formed in the end surface 11 of the tube main body 10 to be joined to the head member 20.

The head member 20 has a projecting portion 21 that is formed so as to be fitted into the through hole 10A of the tube main body 10 and a flange portion 22 that is provided so as to extend radially outwards from the projecting portion 21. The attachment part 100A is provided on the flange portion 22 on the side opposite from the projecting portion 21 in the axial direction. The flange portion 22 is formed so as to have the same outside diameter as the outside diameter of the tube main body 10 and has an annular surface 23 that is formed as the annular flat surface. The projecting portion 21 is provided coaxially with the flange portion 22 and is formed to have the columnar shape projecting out from the annular surface 23. In this configuration, the flange portion 22 side of the projecting portion 21 is referred to as "a base end" of the projecting portion 21, and the opposite side of the base end is referred to as "a front end" of the projecting portion 21.

Figure 6:
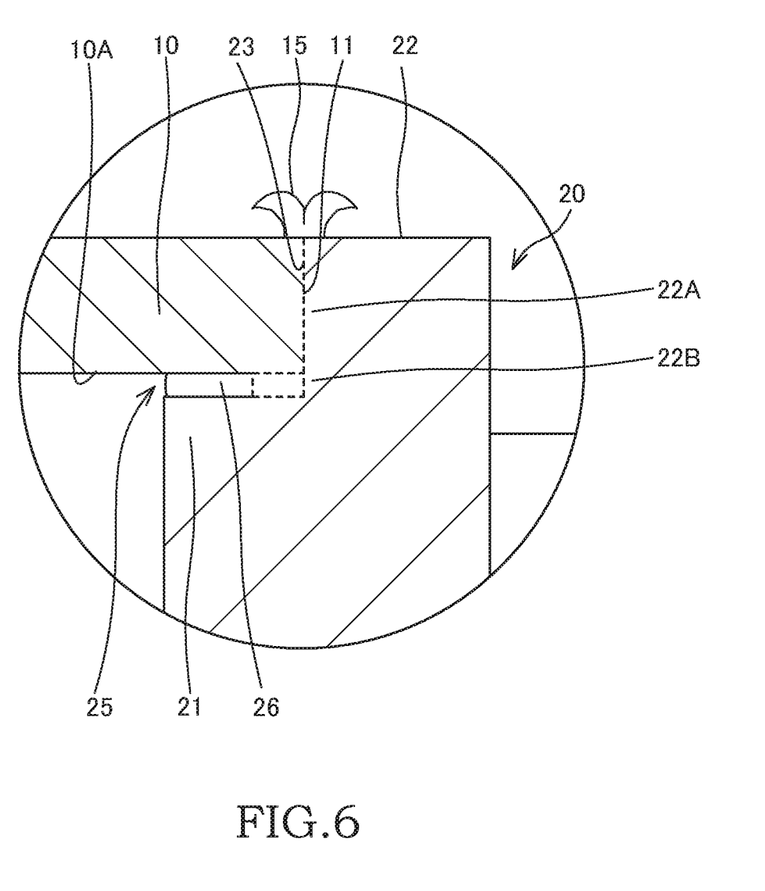
FIG. 6 is a sectional view for explaining the manufacturing method of the cylinder tube according to the embodiment of the present invention, and is a diagram showing a second joining step.

The cylinder tube 100 is manufactured by following manufacturing steps. In the followings, a step (2) corresponds to a first joining step, and a step (4) corresponds to a second joining step. In addition, broken lines in FIG. 6 show joint interface between the tube main body 10 and the head member 20.

(1) As shown in FIG. 2, the tube main body 10 and the head member 20 are first disposed coaxially such that the end surface (a joining face) 11 of the tube main body 10 on one side and the annular surface 23 (the joining face) of the head member 20 face each other.

Figure 3:
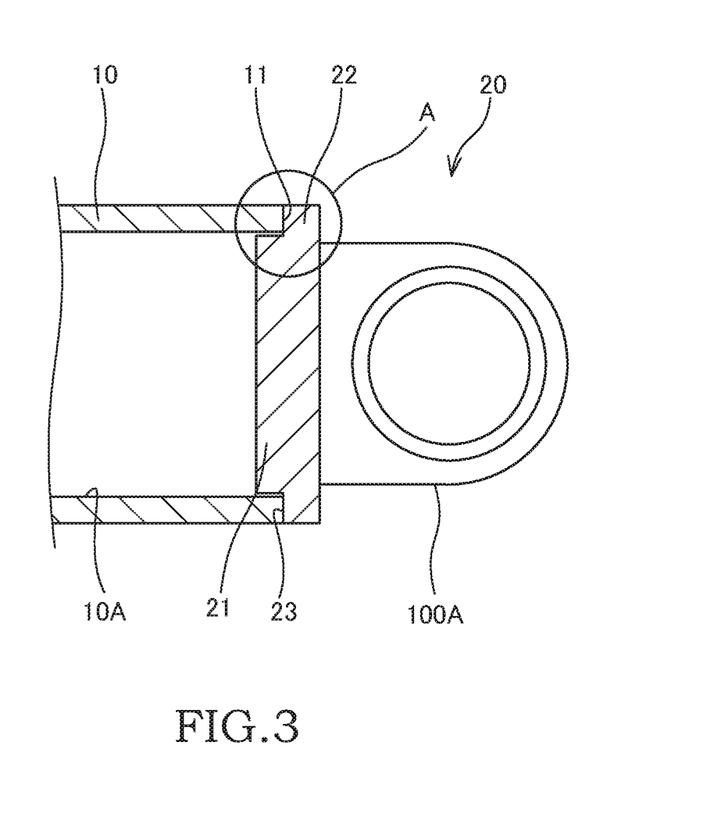
FIG. 3 is a sectional view for explaining the manufacturing method of the cylinder tube according to the embodiment of the present invention, and is a diagram showing a first joining step.

(2) Next, as shown in FIG. 3, while rotating the head member 20 about its central axis, the tube main body 10 is moved towards the head member 20. Then, the projecting portion 21 of the head member 20 is fitted into the through hole 10A of the tube main body 10 and the end surface 11 of the tube main body 10 is pressed against the annular surface 23 of the head member 20. As the end surface 11 of the tube main body 10 is pressed against the annular surface 23, friction heat is generated between the end surface 11 and the annular surface 23.

Figure 4:
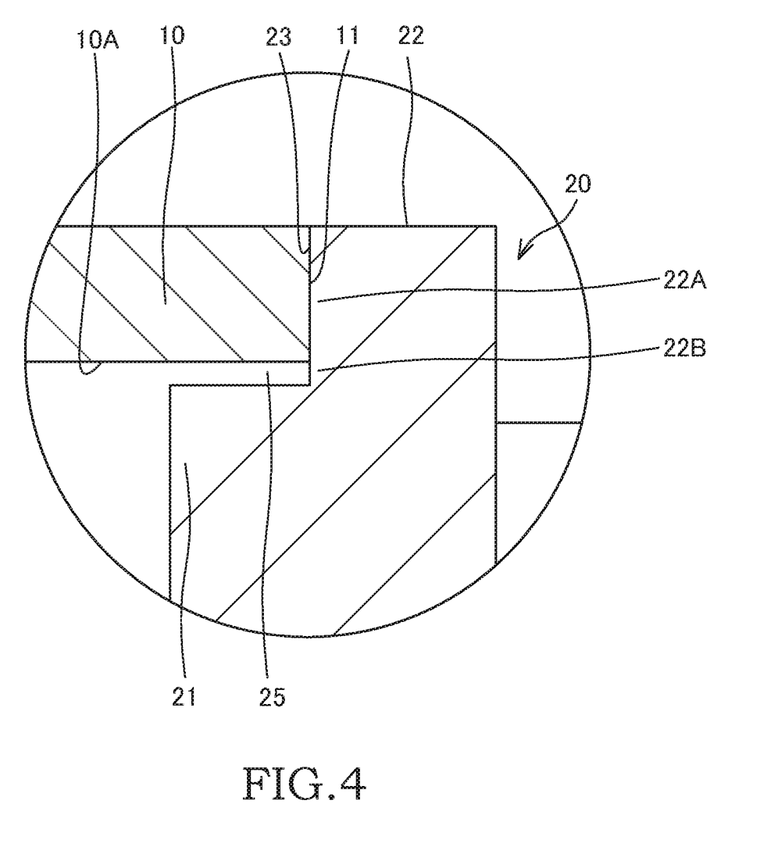
FIG. 4 is an enlarged view of a portion A in FIG. 3.
Figure 5:
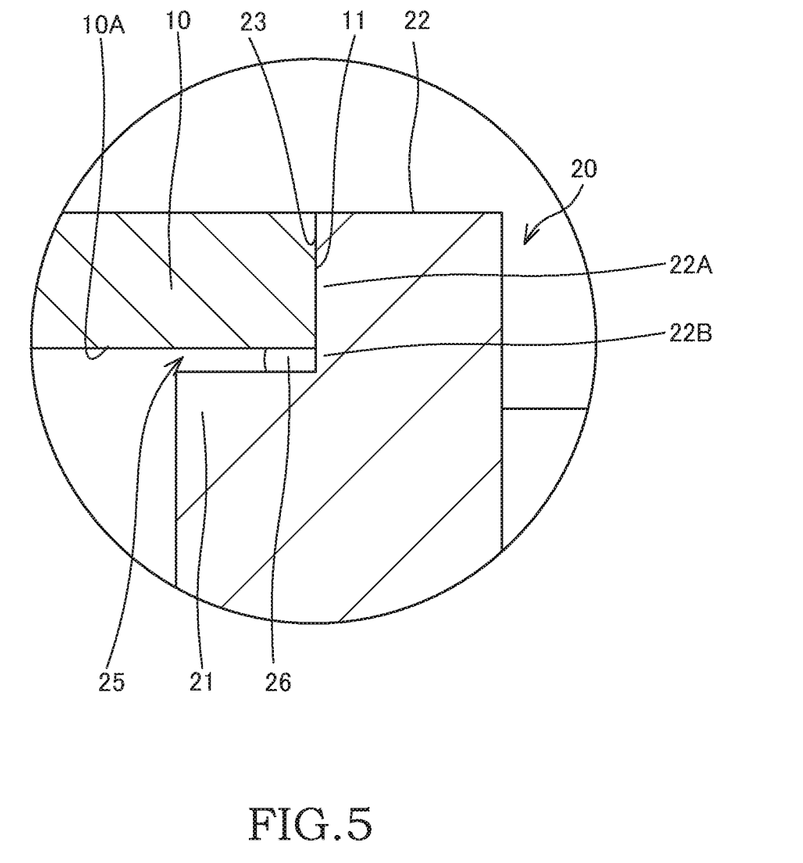
FIG. 5 is a sectional view for explaining the manufacturing method of the cylinder tube according to the embodiment of the present invention, and is a diagram showing the first joining step.

In this configuration, as shown in FIG. 4, the projecting portion 21 is fitted into the through hole 10A such that a clearance 25 is formed therebetween. Thus, the end surface 11 of the tube main body 10 is brought into contact with a part of an outer circumferential side of the annular surface 23, whereas a part of an inner circumferential side of the annular surface 23 is not brought into contact with the tube main body 10. In the following description, in the flange portion 22 of the head member 20, a part of the flange portion 22 being brought into contact with the end surface 11 of the tube main body 10 is referred to as "a contact portion 22A", and an inner part of the contact portion 22A in the radial direction that is not brought into contact with the end surface 11 is referred to as "a non-contact portion 22B". The non-contact portion 22B is a part that faces the clearance 25 between the through hole 10A of the tube main body 10 and the projecting portion 21 of the head member 20 and is a part that connects the contact portion 22A and the projecting portion 21.

By generating the friction heat between the end surface 11 of the tube main body 10 and the annular surface 23 of the head member 20, the end surface 11 and the contact portion 22A are softened. In addition, the non-contact portion 22B that is not brought into contact with the end surface 11 is heated by heat conduction from the contact portion 22A that has been softened. Furthermore, parts of materials of the contact portion 22A and the non-contact portion 22B that have been softened flow into the clearance 25 so as to come to contact with an outer circumferential surface of the projecting portion 21 of the head member 20 (see FIG. 5). Thus, the friction heat is also generated between the material that has flowed into the clearance 25 and the outer circumferential surface of the projecting portion 21 of the head member 20, and a part of the outer circumferential surface of the projecting portion 21 (a part on the base portion side) is also heated and softened.

(3) Once the non-contact portion 22B is heated to the extent that it is softened sufficiently by the friction heat between the end surface 11 of the tube main body 10 and the contact portion 22A of the flange portion 22, the rotation of the head member 20 is stopped. More specifically, a moved amount by pressing the tube main body 10 or a pressing time of the tube main body 10 required to soften the non-contact portion 22B is determined by performing experiments etc. in advance. A control is performed such that the rotation of the head member 20 is stopped when the determined moved amount or the pressing time has been achieved.

(4) The tube main body 10 is further pressed towards the head member 20 with a large load such that, as shown in FIG. 6, the heated high-temperature portion is allowed to plastically flow towards the outer circumferential side and the inner circumferential side of the tube main body 10. The material that has plastically flowed towards the outer circumferential side is ejected as a burr 15. The material that has plastically flowed towards the inner circumferential side (hereinafter, referred to as "an inner circumferential side material 26") is guided to the clearance 25 between the inner circumferential surface of the tube main body 10 and the outer circumferential surface of the projecting portion 21 and fills the clearance 25.

(5) Finally, the pressed state achieved in the above-described (4) is maintained for a predetermined period of time in order to promote mutual diffusion between the heated and softened tube main body 10 and the head member 20, and thereby, joining of the tube main body 10 and the head member 20 is completed. In the head member 20, as the contact portion 22A in contact with the end surface 11 of the tube main body 10 is softened by the friction heat, the non-contact portion 22B is also heated and softened by the friction heat. Thus, in addition to the contact portion 22A, the head member 20 is joined to the tube main body 10 also at the non-contact portion 22B. In addition, in the above-described (2), a part of the softened materials at the contact portion 22A and the non-contact portion 22B is guided to the clearance 25 between the inner circumferential surface of the tube main body 10 and the outer circumferential surface of the projecting portion 21. A part of the outer circumferential surface of the projecting portion 21 is also heated by the friction heat generated between the material that has flowed to the clearance 25 (in other words, the material of a part of the inner circumferential side material 26 on the base portion side of the projecting portion 21) and the outer circumferential surface of the projecting portion 21. Therefore, a part of the outer circumferential surface of the projecting portion 21 that has been heated and softened by the friction heat is also joined to the inner circumferential surface of the tube main body 10. As described above, in the present embodiment, the annular surface 23 is joined to the tube main body 10 over the entire area thereof, and so, a configuration in which the joint interface shown by the broken lines in FIG. 6 extends radially outwards from a base portion of the projecting portion 21 to an outer circumferential surface of the tube main body 10 is achieved. As described above, the joining of the tube main body 10 and the head member 20 by means of the friction welding is conducted.

The burr 15 that has been ejected to the outer circumferential side of a joining face between the tube main body 10 and the head member 20 is cut away after completion of the joining such that the outer circumferences of the tube main body 10 and the head member 20 are processed to have a smooth continuous surface. In a case in which a presence of the burr 15 does not cause a problem, the burr 15 may not be cut away, and the burr 15 may be left on the outer circumferential side of the cylinder tube 100.

If the inner circumferential side material 26 flows out from the clearance 25 into an internal space of the cylinder tube 100, the burr is also formed on the inner circumferential side of the cylinder tube 100. During a process in which the inner circumferential side material 26 is cooled and the burr is formed, so called oxidized scale is formed. It is difficult to remove or wash out the burr and/or the oxidized scale on the inner circumferential side of the cylinder tube 100. If the working oil is guided into the cylinder tube 100 in a state in which the burr is formed on the inner circumferential side as described above, there is a risk in that the oxidized scale is mixed into the working oil and forms so called a contaminant.

Thus, in the joining step of the present embodiment, it is preferable that the plastic flow of the inner circumferential side material 26 be controlled such that the clearance 25 is filled with the inner circumferential side material 26, but the inner circumferential side material 26 does not flow out to the internal space of the cylinder tube 100. More specifically, it is preferable that the clearance 25 be filled with the inner circumferential side material 26 to the extent that the inner circumferential side material 26 does not form the burr by projecting out from an end surface of the projecting portion 21 to the left side in FIG. 6. By doing so, it is possible to effectively prevent the formation of the contaminant in the working oil. In other words, with the manufacturing method according to the present embodiment, by controlling the plastic flow of the inner circumferential side material 26, it is possible to suppress the formation of the burr on the inner circumferential side of the cylinder tube 100.

After completion of the joining step, a quality inspection is performed on a friction welded portion between the tube main body 10 and the head member 20 by conducting a nondestructive test including an ultrasonic inspection etc. By performing such a quality inspection, it is possible to detect any joining failures etc. in the friction welded portion.

Figure 11:
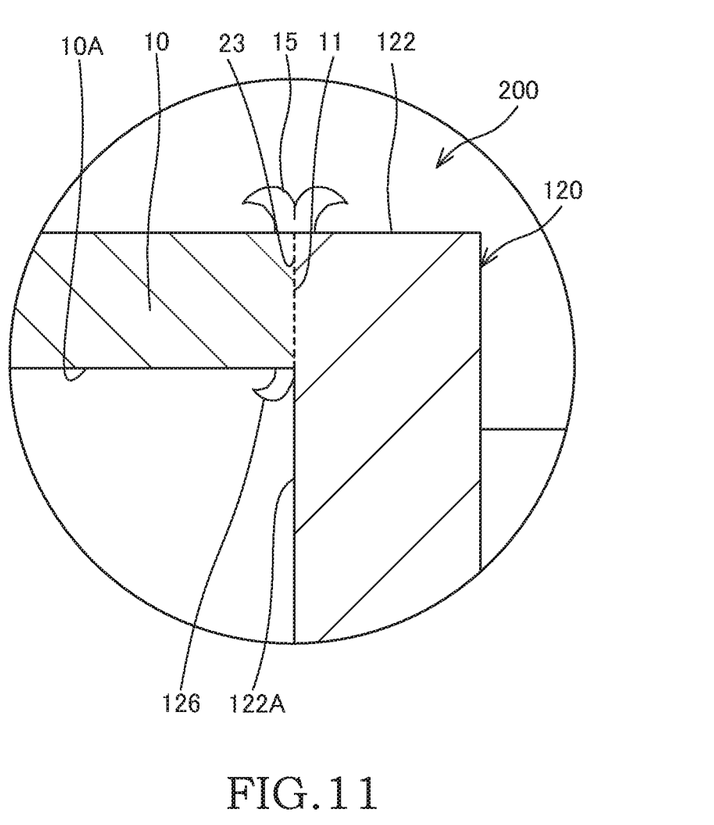
FIG. 11 is a sectional view for explaining a comparative example of the manufacturing method of the cylinder tube according to the embodiment of the present invention.

For ease of understanding the present invention, the manufacturing method of a cylinder tube 200 according to a comparative example of the present invention will be described with reference to FIG. 11. Configurations that are similar to those in the present embodiment are assigned the same reference signs, and descriptions thereof shall be omitted appropriately.

In the manufacturing method according to the comparative example, a head member 120 does not have the projecting portion 21 and an end surface 122A is formed as a circular flat surface.

In the manufacturing method according to the comparative example, the friction welding is conducted by bringing the end surface 11 of the tube main body 10 into contact with an end surface 122 of the head member 120. During the friction welding, the softened material by the friction heat is ejected as a burr 126 to the inner circumferential side. In a case in which the joining face of thus manufactured cylinder tube 200 is subjected to the quality inspection by the nondestructive test, because the through hole 10A of the tube main body 10 (the hollow portion) is present formed on the inner side of a joint portion, there is a risk in that the through hole 10A is recognized as a defect caused by a joining failure. Therefore, it is difficult to perform the quality inspection by the nondestructive test on the cylinder tube 200 manufactured by the manufacturing method according to the comparative example.

In contrast, according to the present embodiment, in addition to the contact portion 22A in contact with the tube main body 10, the non-contact portion 22B is also heated and softened, and thereby, the non-contact portion 22B is also joined to the tube main body 10. In other words, a size of the clearance 25 is set such that the non-contact portion 22B can be heated to the extent that it is softened by the friction heat generated between the end surface 11 of the tube main body 10 and the contact portion 22A of the head member 20. With such a configuration, the cylinder tube 100 is formed such that the joint interface between the head member 20 and the tube main body 10 extends from the base portion of the projecting portion 21 of the head member 20 to the outer circumferential surfaces of the flange portion 22 and the tube main body 10. Thus, the clearance 25 does not remain as is before the joining, and so, a joint part of the tube main body 10 and the head member 20 forms a solid structure. Therefore, the clearance 25 that has been formed before the joining can be prevented from being recognized as the defect in the nondestructive test, and so, it is possible to perform the quality inspection by the nondestructive test with ease.

In addition, in the present embodiment, by performing the control on the inner circumferential side material 26 guided to the clearance 25, it is possible to suppress the formation of burr on the inner circumferential side of the cylinder tube 100. Therefore, it is possible to suppress mixing of the oxidized scale into the working oil that leads to formation of the contaminant.

It suffices that the clearance 25 is partially filled from the front end side of the tube main body 10 (the base end side of the projecting portion 21), which is the right side in FIG. 6, and the clearance 25 is not required to be filled entirely with the inner circumferential side material 26. It suffices that at least a part of the clearance 25 located at the inner side of the joint portion of the tube main body 10 and the head member 20 is filled and that the joint part of the tube main body 10 and the head member 20 forms the solid structure. In other words, in this description, a phrase "the clearance 25 is filled" does not only mean a state in which the clearance 25 is filled entirely, but also means a state in which the clearance 25 remains as a gap on the front end side of the projecting portion 21 (the left side in FIG. 6) etc.

Next, a case in which the joined body is the piston rod 101 will be described with reference to FIGS. 7 to 9.

Figure 7:
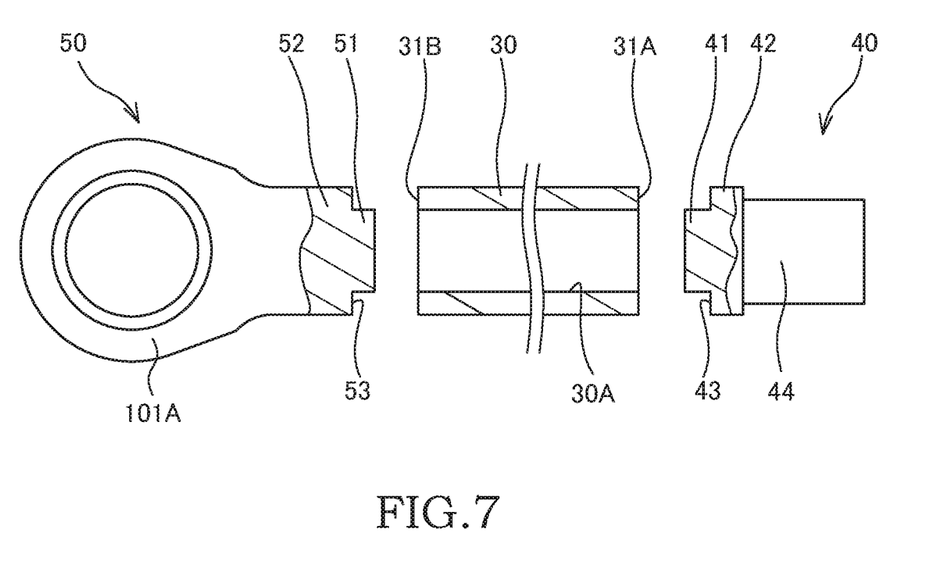
FIG. 7 is a sectional view for explaining a manufacturing method of a piston rod according to the embodiment of the present invention, and is a diagram showing a state before the joining.
Figure 8:
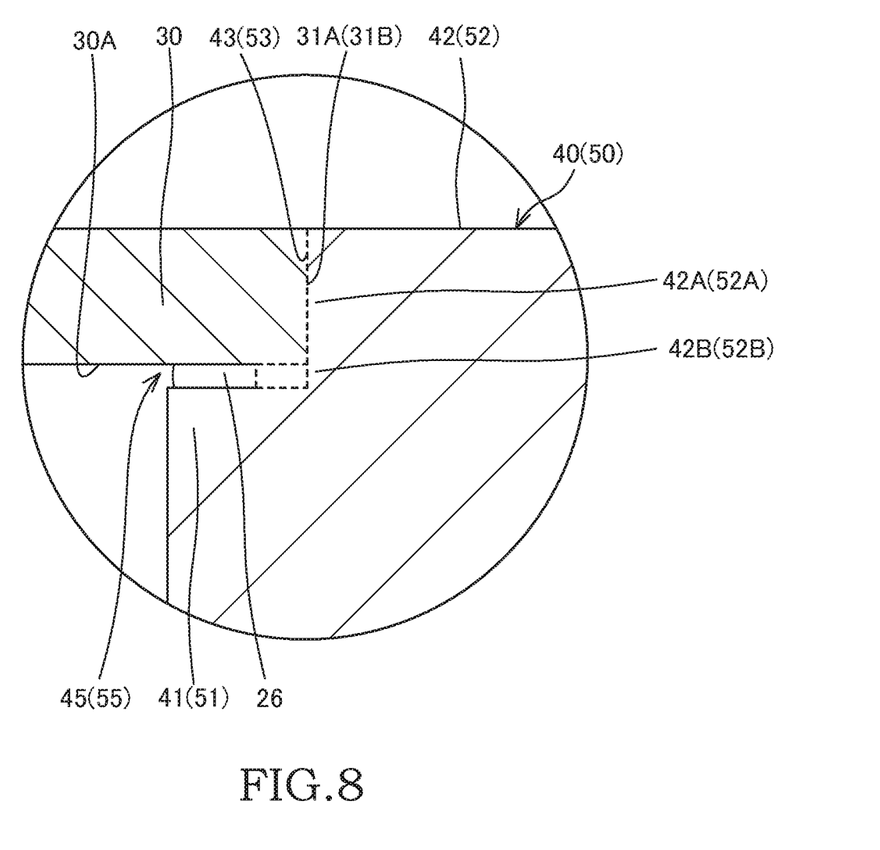
FIG. 8 is a sectional view for explaining the manufacturing method of the piston rod according to the embodiment of the present invention, and is a diagram showing a state in which the joining of a first member and a second member has been completed.

As shown in FIG. 7, the piston rod 101 is manufactured by joining a rod main body 30 serving as the first member to a screw member 40 and a rod head 50 serving as the second members by means of the friction welding.

The rod main body 30 is formed to have a cylindrical shape having a through hole 30A that opens at both end surfaces in the axial direction. Both of end surfaces 31A and 31B of the rod main body 30 are formed as the annular flat surfaces. The through hole 30A corresponds to the hollow portions that are respectively formed in the end surfaces 31A and 31B of the rod main body 30 to be joined to the screw member 40 and the rod head 50.

The screw member 40 has a projecting portion 41 that is formed so as to be fitted into the through hole 30A of the rod main body 30 and a flange portion 42 that is provided so as to extend radially outwards from the projecting portion 41. A boss portion 44 is provided on the flange portion 42 on the side opposite from the projecting portion 41 in the axial direction. The boss portion 44 is provided with a male screw 44A formed on an outer circumference thereof, and the piston 2 is screw-fastened to the male screw 44A. The flange portion 42 is formed so as to have the same outside diameter as the outside diameter of the rod main body 30 and has an annular surface 43 that is formed as the annular flat surface. The projecting portion 41 is provided coaxially with the flange portion 42 and is formed to have the columnar shape projecting out from the annular surface 43.

The rod head 50 has a projecting portion 51 that is formed so as to be fitted into the through hole 30A of the rod main body 30 and a flange portion 52 that is provided so as to extend radially outwards from the projecting portion 51. The attachment part 101A is provided on the flange portion 52 on the side opposite from the projecting portion 51 in the axial direction. The flange portion 52 is formed so as to have the same outside diameter as the outside diameter of the rod main body 30 and has an annular surface 53 that is formed as the annular flat surface. The projecting portion 51 is provided coaxially with the flange portion 52 and is formed to have the columnar shape projecting out from the annular surface 53.

The piston rod 101 is manufactured by joining the above-described rod main body 30 to the screw member 40 and the rod head 50 by the joining method similar to the above-described joining method for joining the tube main body 10 and the head member 20.

With the manufacturing method of the piston rod 101 according to the present embodiment, the hollow rod main body 30 is first joined to the screw member 40. More specifically, similarly to the above-described joining method for the tube main body 10 and the head member 20, the rod main body 30 and the screw member 40 are disposed coaxially such that the end surface 31A of the rod main body 30 on one side and the annular surface 43 of the screw member 40 face each other, and the screw member 40 is moved towards the rod main body 30 while rotating the screw member 40 about its central axis. At this time, as shown in FIG. 7, the male screw 44A is not formed on the boss portion 44 of the screw member 40. Then, the projecting portion 41 of the screw member 40 is fitted into the through hole 30A of the rod main body 30, and the end surface 31A of the rod main body 30 on one side is pressed against the annular surface 43 of the screw member 40 to generate the friction heat therebetween. A contact portion 42A and a non-contact portion 42B of the flange portion 42 of the screw member 40 are heated and softened sufficiently by the friction heat. The rotation of the screw member 40 is stopped, and the rod main body 30 is further pressed against the screw member 40 with a large load. Thereafter, the pressed state is maintained for a predetermined period of time to allow both members to be joined (see FIG. 8).

By doing so, in the flange portion 42 of the screw member 40, the contact portion 42A in contact with the end surface 31A of the rod main body 30 and the non-contact portion 42B facing a clearance 45 are both joined to the rod main body 30. Thus the piston rod 101 is formed such that the joint interface between the rod main body 30 and the screw member 40 extends from the base portion of the projecting portion 41 in the screw member 40 to outer circumferential surfaces of the flange portion 42 and the rod main body 30. Unlike the cylinder tube 100, the working oil is not guided to inside the piston rod 101. Thus, the formation of contaminant need not be considered, and thereby, the inner circumferential side material 26 may be allowed to flow out to the through hole 30A to form the burr on the inner circumferential side.

Figure 9:
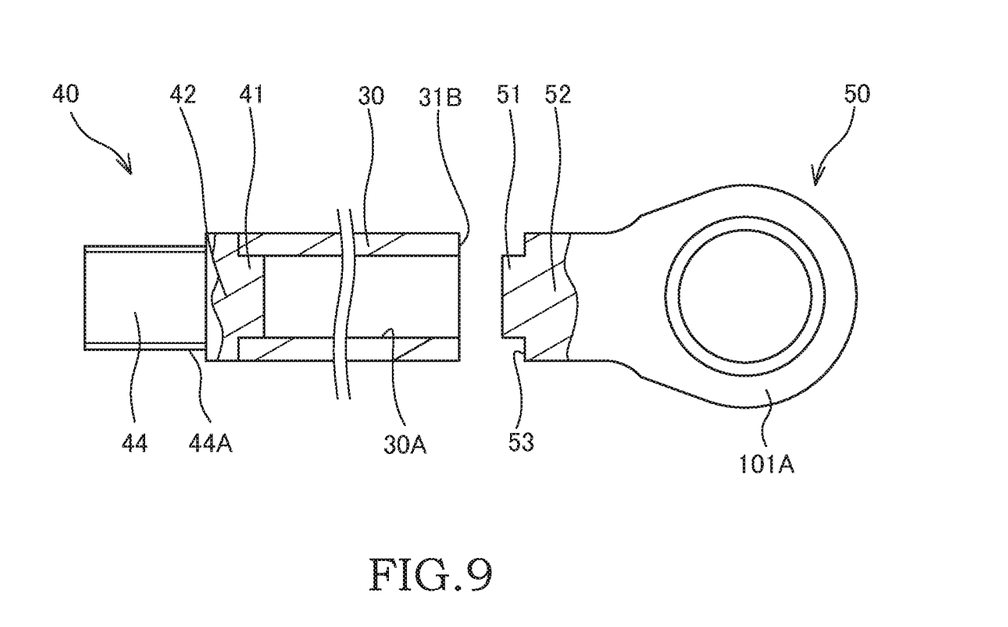
FIG. 9 is a sectional view for explaining the manufacturing method of the piston rod according to the embodiment of the present invention, and is a diagram showing a state before the joining of a rod main body and a rod head.

After the rod main body 30 and the screw member 40 are joined as described above, the burr formed on the outer circumference of the joining face is removed and the male screw 44A is formed on the outer circumference of the boss portion 44 (see FIG. 9). As described above, by forming the male screw 44A after the rod main body 30 and the screw member 40 are joined, the concentricity of the male screw 44A with respect to the rod main body 30 can be achieved with ease. In other words, by forming the male screw 44A after the rod main body 30 and the screw member 40 are joined, an effect of misalignment caused by joining can be ignored, and therefore, it is possible to form the male screw 44A with ease while ensuring the concentricity. The male screw 44A may be formed on the boss portion 44 in advance, and the rod main body 30 and the screw member 40 formed with the male screw 44A may be joined by means of the friction welding.

Next, the rod head 50 is joined to the rod main body 30 to which the screw member 40 has been joined (see FIG. 9). Because the joining of the rod main body 30 and the rod head 50 is achieved by the method similar to those for the joining of the tube main body 10 and the head member 20 and for the joining of the rod main body 30 and the screw member 40, specific descriptions thereof shall be omitted. In FIG. 8, reference signs in parentheses show corresponding components for a case in which the rod main body 30 and the rod head 50 are joined. As described above, the piston rod 101 shown in FIG. 1 is manufactured. The piston rod 101 may be manufactured by joining the rod main body 30 and the screw member 40 after the rod main body 30 and the rod head 50 are joined.

By manufacturing the piston rod 101 by the manufacturing method according to the present embodiment, it is possible to achieve a configuration in which the joint portion has the solid structure, and at the same time, a portion where the through hole 30A remaining has a hollow structure. Thus, it is possible to perform the inspection by the nondestructive test with ease, and at the same time, it is possible to make the piston rod 101 lighter. In addition, because a part of the piston rod 101 can be formed to have the hollow structure, it is possible to improve a yield and to reduce a cost for the material.

Next, modifications of the present embodiment will be described. The modification described below also falls within the scope of the present invention. It may be possible to combine the following modifications with the respective configurations in the above-mentioned embodiment, and it may also be possible to combine the following modifications with each other. Similarly, it may also be possible to optionally combine the modification described in the above-mentioned description of the embodiment with other modifications.

Figure 10:
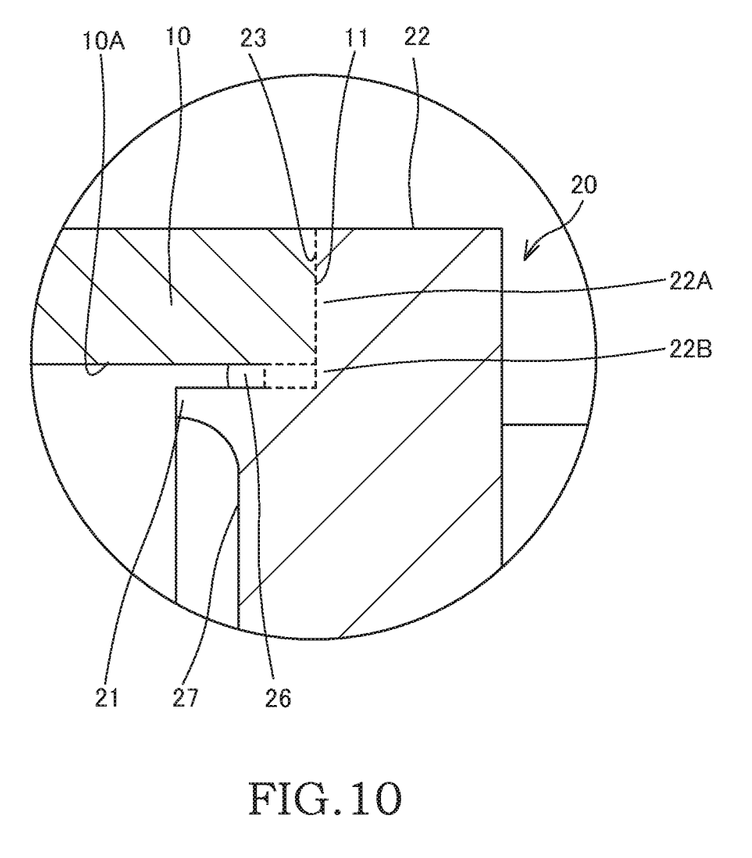
FIG. 10 is a sectional view for explaining a modification of the manufacturing method of the cylinder tube according to the embodiment of the present invention.

In the above-mentioned embodiment, the projecting portion (21, 41) of the head member 20 and the rod head 50 has the solid structure. In contrast, as with a joint area of the tube main body and the head member shown in FIG. 10, for example, a recessed portion 27 may be formed in an end surface of the projecting portion (21, 41) in a region not overlapping with the inner side of the joint portion. In other words, it suffices that the projecting portion (21, 41) has the solid structure at the base portion that is connected to the flange portion (22, 42) and joined to the tube main body 10 or the rod main body 30.

According to the embodiment mentioned above, the advantages described below are afforded.

According to the manufacturing method of the joined body (the cylinder tube 100, the piston rod 101) according to the present embodiment, in the second member (the head member 20, the screw member 40, the rod head 50), in addition to the contact portion (22A, 42A) in contact with the first member (the tube main body 10, the rod main body 30), the non-contact portion (22B, 42B) is also heated and softened. Therefore, the non-contact portion (22B, 42B) is also joined to the first member (the tube main body 10, the rod main body 30). Thus, the clearance (25, 45) does not remain as is before the joining, and so, the joint part of the first member (the tube main body 10, the rod main body 30) and the second member (the head member 20, the screw member 40, the rod head 50) forms the solid structure. Therefore, the clearance (25, 45, 55) that has been formed before the joining can be prevented from being recognized as the defect in the nondestructive test, and so, it is possible to perform the quality inspection by the nondestructive test with ease.

In addition, with the manufacturing method of the cylinder tube 100 according to the present embodiment, the control is performed such that the inner circumferential side material 26 fills the clearance 25 between the through hole 10A of the tube main body 10 and the projecting portion 21 of the head member 20, but the inner circumferential side material 26 does not flow out to the internal space of the cylinder tube 100. By doing so, it is possible to make the joint part to have the solid structure with higher reliability, and at the same time, it is possible to prevent formation of the contaminant in the working oil.

The configurations, operations, and effects of the embodiment according to the present invention will be collectively described below.

Provided is the manufacturing method for manufacturing the joined body (the cylinder tube 100, the piston rod 101) by joining the first member (the tube main body 10, the rod main body 30) and the second member (the head member 20, the screw member 40, the rod head 50), the first member (the tube main body 10, the rod main body 30) having the hollow portion (the through hole 10A, 30A) formed in the end surface (11, 31A, 31B) and the second member (the head member 20, the screw member 40, the rod head 50) having the projecting portion (21, 41, 51) that is to be fitted into the hollow portion (the through hole 10A, 30A) and the flange portion (22, 42, 52) that is provided so as to extend radially outwards from the projecting portion (21, 41, 51), the manufacturing method including the joining step of joining the first member (the tube main body 10, the rod main body 30) and the second member (the head member 20, the screw member 40, the rod head 50) by the friction welding by abutting the end surface (11, 31A, 31B) and the flange portion (22, 42, 52) in a state in which the hollow portion (the through hole 10A, 30A) and the projecting portion (21, 41, 51) are fitted to each other so as to form the predetermined clearance (25, 45, 55), wherein, in the joining step, the non-contact portion (22B, 42B, 52B) of the flange portion (22, 42, 52) of the second member (the head member 20, the screw member 40, the rod head 50) facing the clearance (25, 45, 55) is joined to the first member (the tube main body 10, the rod main body 30) by heating the non-contact portion (22B, 42B, 52B) with the friction heat generated by the relative rotation between the first member (the tube main body 10, the rod main body 30) and the second member (the head member 20, the screw member 40, the rod head 50).

With such a configuration, the non-contact portion (22B, 42B, 52B) that faces the clearance (25, 45, 55) between the hollow portion (the through hole 10A, 30A) and the projecting portion (21, 41, 51), but that is not brought into contact with the end surface (11, 31A, 31B) of the first member (the tube main body 10, the rod main body 30) is also heated by the friction heat, and the non-contact portion (22B, 42B, 52B) is also joined to the first member (the tube main body 10, the rod main body 30). As described above, because the clearance (25, 45, 55) between the hollow portion (the through hole 10A, 30A) and the projecting portion (21, 41, 51) inside the joint part is filled by the friction welding, it is possible to make the joint portion to have the solid structure. Thus, the hollow portion (the through hole 10A, 30A) is prevented from being recognized as the defect by the nondestructive test. Therefore, it is possible to perform the quality inspection of the joined body (the cylinder tube 100, the piston rod 101) with ease.

In addition, in the manufacturing method for manufacturing the cylinder tube 100 as the joined body, the joining step includes: the first joining step of generating the friction heat between the end surface 11 and the annular surface 23 of the flange portion 22 by relatively rotating the tube main body 10 and the head member 20 in a state in which the end surface 11 of the tube main body 10 is brought into contact with the annular surface 23 of the flange portion 22 of the head member 20; and the second joining step of pressing the tube main body 10 and the head member 20 against each other in a state in which the relative rotation between the tube main body 10 and the head member 20 is stopped, and in the second joining step, the clearance 25 between the projecting portion 21 and the through hole 10A is filled from the base end side of the projecting portion 21 with the material (the inner circumferential side material 26) plastically flowing from between the end surface 11 and the annular surface 23 of the flange portion 22.

With such a configuration, because the clearance 25 between the through hole 10A of the tube main body 10 and the projecting portion 21 of the head member 20 is filled with the inner circumferential side material 26 during the joining step, it is possible to make the joint part to have the solid structure with higher reliability.

In addition, the joined body (the cylinder tube 100, the piston rod 101) includes the first member (the tube main body 10, the rod main body 30) and the second member (the head member 20, the screw member 40, the rod head 50), the first member (the tube main body 10, the rod main body 30) having the hollow portion (the through hole 10A, 30A) formed in the end surface (11, 31A, 31B) and the second member (the head member 20, the screw member 40, the rod head 50) configured to have the projecting portion (21, 41, 51) that is to be fitted into the hollow portion (the through hole 10A, 30A) and the flange portion (22, 42, 52) that is provided so as to extend radially outwards from the projecting portion (21, 41, 51) and that is to be joined to the end surface (11, 31A, 31B) of the first member (the tube main body 10, the rod main body 30). In the joined body (the cylinder tube 100, the piston rod 101), the joint interface between the end surface (11, 31A, 31B) of the first member (the tube main body 10, the rod main body 30) and the flange portion (22, 42, 52) of the second member (the head member 20, the screw member 40, the rod head 50) extends radially outwards from the base portion of the projecting portion (21, 41, 51).

With such a configuration, because the joint interface extends radially outwards from the base portion of the projecting portion (21, 41, 51) and the joint portion has the solid structure, the hollow portion (the through hole 10A, 30A) is not recognized as the defect by the nondestructive test. Therefore, it is possible to perform the quality inspection of the joined body (the cylinder tube 100, the piston rod 101) with ease.

Embodiments of this invention were described above, but the above embodiments are merely examples of applications of this invention, and the technical scope of this invention is not limited to the specific constitutions of the above embodiments.

This application claims priority based on Japanese Patent Application No. 2017-64976 filed with the Japan Patent Office on Mar. 29, 2017, the entire contents of which are incorporated into this specification.

The invention claimed is:

1. A manufacturing method for manufacturing a joined body by joining a first member and a second member, the first member having a hollow portion formed in an end surface and the second member having a projecting portion that is to be fitted into the hollow portion and a flange portion that is provided so as to extend radially outwards from the projecting portion, the manufacturing method comprising:
a joining step of joining the first member and the second member by friction welding by abutting the end surface of the first member and the flange portion of the second member in a state in which the hollow portion of the first member and the projecting portion of the second member are fitted to each other so as to form a clearance between an outer peripheral surface of the projecting portion of the second member and an inner peripheral surface of the hollow portion of the first member, a surface of the flange portion facing the first member including a contact portion, through which the flange portion is in direct contact with the end surface of the first member, and a non-contact portion exposed to the clearance, wherein
in the joining step, the non-contact portion of the surface of the flange portion facing the clearance is joined to the first member via a material that plastically flows into the clearance and that contacts the outer peripheral surface of the projecting portion of the second member and the inner peripheral surface of the hollow portion of the first member by heating the non-contact portion with friction heat generated by relative rotation between the first member and the second member, and
the joined body is a cylinder tube or a piston rod used for a fluid pressure cylinder.

2. The manufacturing method of the joined body according to claim 1, wherein
the joining step includes:
a first joining step of generating the friction heat between the end surface of the first member and the flange portion of the second member by relatively rotating the first member and the second member in a state in which the end surface is brought into contact with the flange portion; and
a second joining step of pressing the first member and the second member against each other in a state in which the relative rotation between the first member and the second member is stopped, and
in the second joining step, by heating the non-contact portion of the surface of the flange portion, filling the clearance with the material plastically flowing from the end surface of the first member and the flange portion of the second member.

3. The manufacturing method of the joined body according to claim 1, further comprising
an inspection step for performing a quality inspection by a nondestructive test on a joint part of the first member and the second member, the inspection step being performed after the joining step.

4. The manufacturing method of the joined body according to claim 3, wherein
the nondestructive test is performed by an ultrasonic inspection.

5. The manufacturing method of the joined body according to claim 1, wherein
the projecting portion has a recessed portion formed in an end surface thereof.

6. A manufacturing method of the joined body by joining a first member and a second member, the first member having a hollow portion formed in an end surface and the second member having a projecting portion that is to be fitted into the hollow portion and a flange portion that is provided so as to extend radially outwards from the projecting portion, the manufacturing method comprising:
a joining step of joining the first member and the second member by friction welding by abutting the end surface of the first member and the flange portion of the second member in a state in which the hollow portion of the first member and the projecting portion of the second member are fitted to each other so as to form a clearance between an outer peripheral surface of the projecting portion of the second member and an inner peripheral surface of the hollow portion of the first member, a surface of the flange portion facing the first member including a contact portion, through which the flange portion is in direct contact with the end surface of the first member, and a non-contact portion exposed to the clearance, wherein in the joining step, the non-contact portion of the surface of the flange portion facing the clearance is joined to the first member by heating the non-contact portion with friction heat generated by relative rotation between the first member and the second member, the joined body is a cylinder tube or a piston rod used for a fluid pressure cylinder, and a distance between the outer peripheral surface of the projecting portion of the second member and the inner peripheral surface of the follow portion of the first member, in a radial direction of the joined body, is constant in the entire clearance.

7. The manufacturing method of the joined body according to claim 1, wherein the outer peripheral surface of the projecting portion is a cylindrical surface, and an outer diameter of which is uniform along an axial direction of the projecting portion.

\* \* \* \* \*